No. 853,932. PATENTED MAY 14, 1907.
J. F. MONNOT & E. MARTIN.
PROCESS OF MAKING BIMETALLIC PRODUCTS.
APPLICATION FILED APR. 30, 1904.
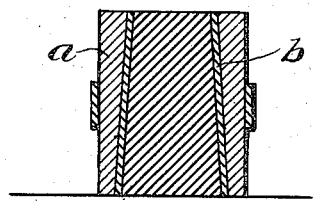
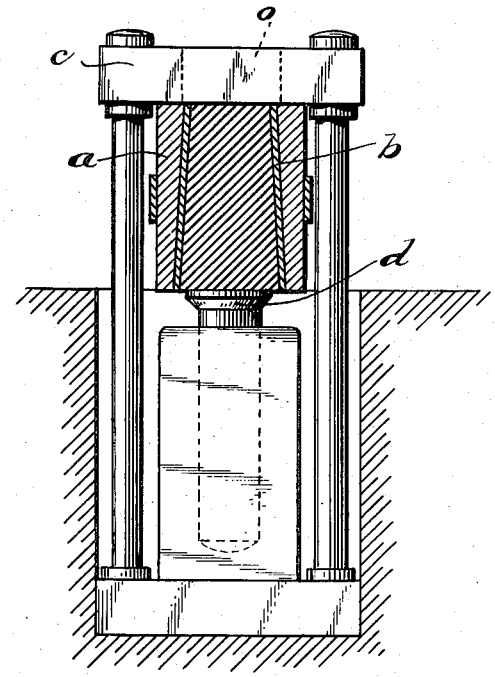
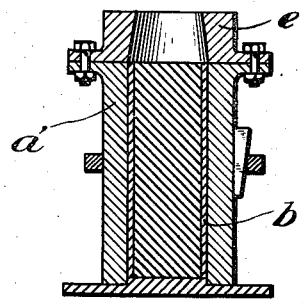
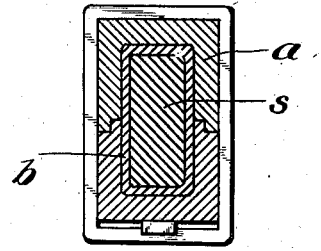
Witnesses
Inventors
JOHN FERREOL MONNOT AND
EDOUARD MARTIN
By Dickerson, Brown, Raegener & Binney
their attys

UNITED STATES PATENT OFFICE.

JOHN FERREOL MONNOT, OF NEW YORK, N. Y., AND EDOUARD MARTIN, OF PARIS, FRANCE; SAID MARTIN ASSIGNOR TO SAID MONNOT.

PROCESS OF MAKING BIMETALLIC PRODUCTS.

No. 853,932.　　　　　Specification of Letters Patent.　　　　Patented May 14, 1907.

Application filed April 30, 1904. Serial No. 205,669.

*To all whom it may concern:*

Be it known that we, JOHN FERREOL MONNOT, a citizen of the United States, and a resident of the borough of Manhattan, city, county, and State of New York, and EDOUARD MARTIN, a citizen of the Republic of France, and a resident of Paris, France, have invented certain new and useful Improvements in Processes of Making Bimetallic Products, of which the following is a specification, accompanied by drawings.

This invention relates to improvements in processes of making bi-metallic ingots, sheets, tubes, wires, and the like; and its objects are to improve upon such processes and prevent waste, with a reduction of cost in the preparation and handling of the material to be operated upon.

According to this invention the products consist of bi-metals, such as steel and copper, steel and brass, steel and silver, steel and aluminium, nickel and copper, brass and silver, and other pairs of metals of unlike chemical character, that is, joined pairs of metals which have no predominating metallic component in common, which may be found useful. Ingots of any required dimensions may be produced in accordance with this process, and the proportions of the metals entering into the composition of the ingots may be exactly determined and maintained throughout the finishing processes. Once an ingot, for instance, is produced, the metals comprising it are so united together that it is impossible to separate them either mechanically or by heat. They form a homogeneous mass that may be rolled in sheets or drawn into wires and otherwise acts like a single metal.

Further objects of the invention will hereinafter appear, and to these ends the invention consists of a process for manufacturing bi-metallic ingots, sheets, tubes, wires, and the like, substantially as hereinafter fully described and claimed in this specification. Suitable apparatus for carrying out the process is shown in the accompanying drawings, in which—

Figure 1 is a vertical sectional view through a full ingot mold used in the process; Fig. 2 is an elevation, partly in section, of one of the molds in a press; Fig. 3 is a vertical sectional view of a modified form of mold filled with metal; Fig. 4 is a transverse sectional view of another modified form of mold.

In carrying out the process, a mold $a$, like that shown in Fig. 1, may be used, the bore of which may be cylindrical, or it may be smaller at one end than at the other, as shown in Fig. 2. The interior of the mold may also be pyramidal if desired, or it may be oblong in cross-section, or of any desired cross-section, as for instance, round, square, polygonal, or oval, according to the kind of ingot to be produced. The capacity of the mold will also vary according to the size of the ingot to be produced, from one hundred to five thousand pounds, or more if necessary.

The first step in the process consists of placing in the mold a metallic lining $b$ of the desired metal while in a cold state. This lining may be of copper, brass, silver, or any of the metals with which it is desired to combine the core of the ingot. The lining should fit perfectly inside of the mold and be in good contact therewith and is made by cupping, molding, or hammering the sheet metal on a mandrel having the profile of the ingot mold. The metallic lining $b$ of sheet metal should be of such dimensions as to obtain the proportion in the bi-metal product to be made out of the ingot.

The working of the sheet metal for the lining before it is placed in the mold hardens it. It gives it a close texture, which enables it to resist the high temperatures of the molten steel, and the sheet metal is furthermore used cold to avoid its melting. The surface of the sheet metal lining is hard and smooth after being worked as described, and is not suitable for obtaining a good union with the steel. Therefore before placing the lining in the mold, it is preferably cleaned with cyanid of potassium or other suitable substance, and covered with a thin electrolytic deposit of copper, tin, zinc, or other suitable metal. This electrolytic copper being thin and of loose texture, will melt in contact with the molten steel and alloy with it on the line of contact, thereby facilitating the welding of the so-alloyed steel with the pure sheet of copper.

The ingot mold $a$ lined with the metallic sheet $b$ is then placed on its base and filled up with liquid steel obtained from a steel furnace, preferably from a Siemens-Martin furnace. If metal other than steel is to be used, it is run into the mold in place of the steel. After pouring, the steel has been more or less solidified by cooling at the expense of the jacketing layer of non-ferrous metal and the latter in turn has been heated to a uniting temperature. Both are in a more or less soft or plastic condition, thereby enabling the pressure to work to the best advantage.
The shell should be in good contact with the mold wall and in such condition as to resist complete fusion by the heat of the molten, higher-melting metal cast into it. For copper-coated steel, the copper shells intended to produce ordinary thicknesses of coating are usually employed cool or at ordinary atmospheric temperature. From this stage on, two different apparatuses are shown for carrying out the rest of the process, the final step in the process consisting in applying pressure to the entire surface of contact of the metals, as for instance, by squeezing the core and the lining $b$ through a contracted opening, to form the two metals into a homogeneous mass. If a mold is used having one end smaller than the other, as shown in Fig. 1, it may be transported immediately after the steel is run into it, to an hydraulic press $c$, as shown in Fig. 2. The mold $a$ is firmly maintained in position by the frame of the press, as shown, beneath an opening $o$ of substantially the same size as the small opening in the mold.

The broader base of the conical ingot mold is placed upon the piston $d$ of the hydraulic press, and after permitting a sufficient cooling of the steel or other metal so that it will not run out of the press, the piston $d$ is raised, thereby forcing the ingot through the smaller end of the mold and through the hole $o$ in the frame of the press. The different metals will thus be strongly compressed against the side of the mold, and pressure is applied to the entire surface of contact of the coating metal and the core, thereby perfectly welding the different metals and entirely suppressing the flaws between them.

If a cylindrical mold is used, or one with parallel sides, a spherical, conical, or pyramidal cap $e$ would be placed on the top of the ingot mold $a'$, as shown in Fig. 3, and then both the mold and the cap placed in the hydraulic press. In this case the ingot would be forced through the conical cap $e$ by means of a suitable piston. The core being soft, the pressure of the piston on the core will force the metal against the sides of the mold as well as the die, and thereby cause firm welding. Another mode of operation would be to form the hole $o$ in the frame of the press, conical or pyramidal, and force the metal through this from a cylindrical mold, or one with straight sides. Either form of mold allows the joined metals to be forced out through a contracted orifice by hydraulic or other pressure while still in a soft or comparatively fluent state, thereby applying pressure to the entire surface of contact of such metals.

In the case of using a cylindrical mold, or one having parallel sides, the ingot may be taken out of the mold when it is sufficiently cooled, and carried to suitable rolls with the required profile and there be drawn into a bar of from three to five, or more, times its original length. The rolling operations perfect the union of the different metals and the suppression of any flaws between them.

If the ingot mold is made substantially flat, like that shown in Fig. 4, the ingot may be taken out as described and passed through appropriate rolls, or placed upon the bed of a powerful hydraulic press between two plates of well-planed steel, and strongly compressed to weld the metals together and obviate any flaws between them.

The ingots obtained in accordance with this process may afterward be re-heated in a special furnace having muffles, and then well hammered. They are then ready for different kinds of mills according to the uses of the products, as for instance, for the formation of bars, sheets, tubes, wires, etc. After the ingots have been once prepared as described, in accordance with this process, they may also be worked in ordinary rolling, or wire mills, like a single metal.

Bi-metallic sheets may be made with the coating metal on one side or on both sides, by placing in the ingot mold having a flat section, sheets of copper, brass, silver, etc., on one side or on both sides of the flat faces of the mold, the small faces preferably remaining without any lining.

Obviously, the apparatus for carrying out this process may vary widely and different modes of operation may be found for producing the same ends, by substantially the same steps, therefore, without enumerating all the equivalents of this process, we claim and desire to obtain by Letters Patent the following:

1. The process substantially as hereinafter described of making bi-metallic products of different metals welded together which consists in first applying on the inside surfaces of an ingot mold of suitable shape, a sheet metal lining of the desired metal while in a cold state, for the purpose of forming the coating of the finished product, then running into the cold sheet metal lining of the mold, molten metal for the core or base of a different kind chemically from the metal forming the lining, and forcing the core and the sheet coating metal together by pressure applied to the entire surface of contact of the metals while at a suitable temperature to perfectly weld them and thereby suppress any flaws between them.

2. The process substantially as hereinafter described of making bi-metallic products of different metals welded together, which consists in first applying on the inside surface of an ingot mold of suitable shape, a sheet metal lining of the desired metal while in a cold state, for the purpose of forming the coating of the finished product, then running into the cold sheet metal lining of the mold, molten metal for the core or base of a different kind from the metal forming the lining, and compressing and forcing the sufficiently cooled core and the sheet coating metal while at a suitable temperature through a contracted opening to perfectly weld the two metals together and thereby suppress any flaws between them.

3. The process substantially as hereinafter described of making bi-metallic products, having a base of one kind of metal and a coating of another kind of metal, which consists in preparing the surface of a sheet coating metal, by cleaning the surface and covering the same with an electrolytic deposit of suitable metal, as copper, tin, zinc, or other desired metal, to prevent oxidation and cause perfect welding, then applying the sheet coating metal while in a cold state to the inside surface of an ingot mold of suitable shape for the purpose of forming the coating of the finished product, then running into the cold sheet metal lining of the mold, molten metal for the base of a different kind from the metal forming the lining, and forcing the base and the sheet coating metal together by pressure applied to the entire surface of contact of the metals while at a suitable temperature to perfectly weld them and thereby suppress any flaws between them.

4. The process of making bimetallic ingots, which consists in first applying a sheet-metal lining to the inside surface of a tapering mold, for the purpose of forming the coating of the finished article, then running into the sheet metal lining molten metal for the core or base of a different kind from the metal for forming the coating, and then uniting the core and coating by forcing the ingot, while at a welding temperature, longitudinally of the mold toward the smaller end.

5. The process of producing bimetallic products comprising metals of chemically different character united together which consists in forming a hollow body of one such metal, casting therein an unlike more infusible metal in a molten condition, and compressing the two metals together while still in a plastic condition.

6. The process of producing bimetallic products comprising a ferrous and a non-ferrous metal united together which consists in forming a hollow body of such non-ferrous metal, casting said ferrous metal therein and compressing the two metals together while still in a heated and plastic condition.

7. The process of forming bimetallic products comprising steel and copper united together which consists in forming a hollow copper body, casting steel therein and compressing the two metals together while still in a heated and plastic condition.

8. The process of producing bimetallic products comprising metals of chemically different character united together which consists in forming a hollow body of one such metal, coating with a loose textured film of comparatively fusible metal, casting therein an unlike more infusible metal while in a molten condition, and compressing the two metals together while still in a heated condition.

9. The process of producing bimetallic products of metals of chemically different character united together, which consists in applying to the inside surfaces of an ingot mold of suitable shape, a sheet metal lining of the desired metal while in a cold state, for the purpose of forming the coating of the finished product, then running into the cold sheet metal lining of the mold, a molten metal of chemically different character for the core or base, and forcing the core and the sheet coating metal together by pressure applied to the entire surface of contact of the metals while at a suitable temperature to perfectly unite them and thereby suppress any flaws between them.

10. The process of producing bimetallic products of unlike metals united together, which consists in first applying on the inside surface of an ingot mold of suitable shape a sheet metal lining of the desired metal while in a cold state, for the purpose of forming the coating of the finished product, then running into the cold sheet metal lining of the mold, a molten unlike metal for the core or base, and compressing and forcing the sufficiently cooled core and sheet coating metal while in a plastic condition through a contracted opening to perfectly weld the two metals together and thereby suppress any flaws between them.

11. The process of producing bimetallic products having a base of one metal and a coating of an unlike metal, which consists in preparing the surface of a sheet coating metal by cleaning the surface and covering the same with an electrolytic deposit of comparatively fusible metal, to prevent oxidation and cause perfect welding, then applying the sheet metal while in a cold state to the inside surface of an ingot mold of suitable shape for the purpose of forming the coating of the finished product, then running into the cold sheet metal lining of the mold an unlike molten metal for the base, and forcing the base and sheet coating metal together by pressure applied to the entire surface of contact of the metals while at a suitable temperature to perfectly weld them and thereby suppress any flaws between them.

12. The process of producing bimetallic products comprising unlike metals united together which consists in first applying a sheet metal lining to the inside surface of a tapering mold, for the purpose of forming the coating of the finished article, then running into the sheet metal lining a molten unlike metal for the core or base, and then uniting the core and coating by forcing the ingot while at a welding temperature, longitudinally of the mold toward the smaller end.

13. The process of producing bimetallic products comprising metals of chemically different character united together which consists in forming a hollow body of one such metal, casting therein a more infusible metal of chemically different character in a molten condition, and forcing the compound ingot so formed through a contracted opening to unite said metals together.

14. The process of producing bimetallic products comprising steel and a metal of chemically different character welded together which consists in forming a hollow body of such unlike metal, casting therein molten steel, and forcing the compound ingot so formed through a contracted opening.

15. The process of producing bimetallic products comprising steel and copper welded together which consists in forming a hollow body of copper, casting steel therein and forcing the compound ingot so formed through a contracted opening.

16. The process of producing bimetallic products comprising unlike metals united together which consists in forming a hollow body of one such metal, providing its interior surface with a loose textured layer, of comparatively fusible metal casting therein a more infusible unlike metal in a molten condition, and forcing the compound ingot so formed through a contracted opening to complete the union.

In testimony whereof I have signed this specification in the presence of two subscribing witnesses.

JOHN FERREOL MONNOT.
EDOUARD MARTIN.

Witnesses as to J. F. Monnot:
H. G. OGDEN, Sr.,
E. VAN ZANDT.

Witnesses as to E. Martin:
JEAN BAR,
GAL. CHARLES CAFFARELE.